United States Patent

[11] 3,589,546

[72] Inventor Paul Wedendal
 Aurau 7, Djursholm, Sweden
[21] Appl. No. 830,081
[22] Filed June 3, 1969
[45] Patented June 29, 1971

[54] MEANS FOR DETACHABLE JOINING OF BEAM ELEMENTS
 6 Claims, 7 Drawing Figs.
[52] U.S. Cl .................................................. 287/189.36R, 287/103
[51] Int. Cl ....................................................... F16b 3/00
[50] Field of Search ............................................ 287/189, 36 F, 20.92 T, 20.92, 103, 54 A, 54 B, 54 C, 189.36

[56] References Cited
UNITED STATES PATENTS
2,568,077 9/1951 Loufek ......................... 287/103 X Primary Examiner—Reinaldo P. Machado
Assistant Examiner—Wayne L. Shedd
Attorney—Sommers & Young ABSTRACT: Means for detachably joining two beam elements by a joint which is resistant to bending and torsion forces. The means comprises two engageable parts, one of which has a portion which may be moved into sliding engagement with a mating recess in the other part, with the sliding engagement occurring at right angles to the longitudinal axis of the beam elements which are detachably joined. A screw passes through one of the parts and threadably engages in the other part to prevent separation of the joined parts.

PATENTED JUN29 1971   3,589,546

INVENTOR
Paul Wedendal

MEANS FOR DETACHABLE JOINING OF BEAM ELEMENTS

BACKGROUND OF THE INVENTION

One intended field of use for the invention is crownwork and bridgework by a dentist, where the dentist must often combine parts of the system. Previously this has normally been carried out with the help of soldering with gold solder and has been carried out by dental technicians on a working model in the final stages of the work. The construction thus obtained must be cemented to abutment teeth. In certain cases, for example when the abutment teeth diverge considerably from each other, it may be necessary to make the construction in separate parts which are individually cemented and finally screwed together in the patient's mouth. A considerable number of screws of different dimensions must then be available. It is also obvious that the demand for accurate shaping of the contact surfaces is then extremely great, particularly if these must be designed so that the joining function of the screw joint is assisted. The invention offers a solution with many advantages for the fields of use indicated.

SUMMARY OF THE INVENTION

According to the invention the joining means consists of two parts, one part having a portion thereof which is insertable into an aperture in the other part in a direction perpendicular to the axial direction of the beam element. Said one part is provided with projecting guiding strips which are parallel to the direction of insertion and the other part is provided with corresponding grooves which exactly receive the guiding strips on said one part. The insertion is limited by a plate on the first part attached to a base portion. At least one screw passing through holes in the end part of the plate then attaches the plate to a base portion of the other part in at least one threaded channel in this. In this way detachable locking of the elements is obtained which are attached to the base parts in strips or the like on these parts.

BRIEF DESCRIPTION OF THE DRAWINGS

The invention will be further explained with reference to one embodiment which is shown in the accompanying drawings in which.

DESCRIPTION OF THE PREFERRED EMBODIMENT

Figure 2:
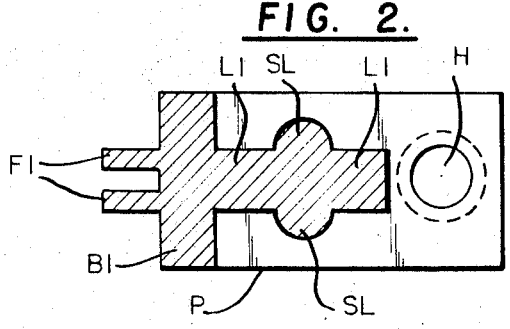
FIG. 2 in cross section along the section line 2-2.
Figure 1:
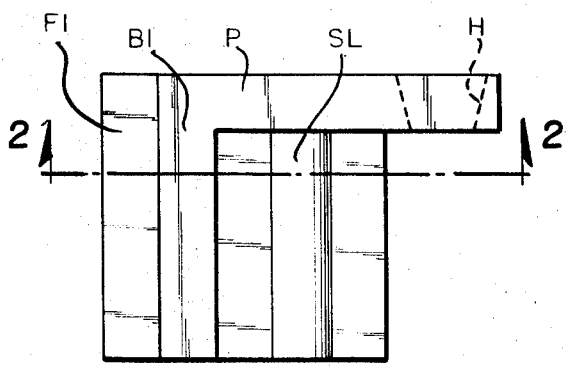
FIG. 1 shows one of the two parts of a joint vertically in side elevation.

One part of the joint according to FIGS. 1 and 2 consists of a base part B I, from which a projecting web portion L I extends perpendicularly. At one end of the base part a plate P is arranged which covers the projection L I and is integrally joined to this. At the end of the plate is a hole H, suitably conical, for a screw. The part is provided approximately centrally on both side surfaces with guiding strips SL which extend perpendicularly to the plate P. These guiding strips suitably have a semicircular cross section according to the drawings. The part is intended to be permanently connected to an element, which is done by means of soldering or welding to strips or the like F I.

Figure 4:
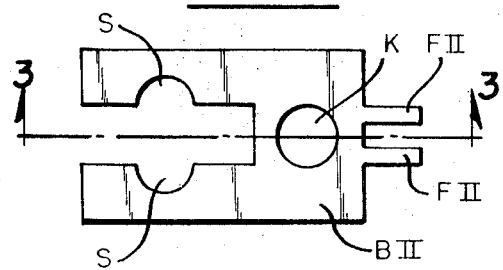
FIG. 4 in cross section in horizontal projection.
Figure 5:
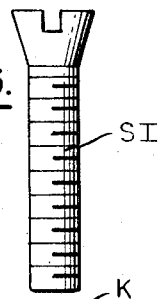
FIG. 5 shows a connecting screw for the screw joint.
Figure 3:
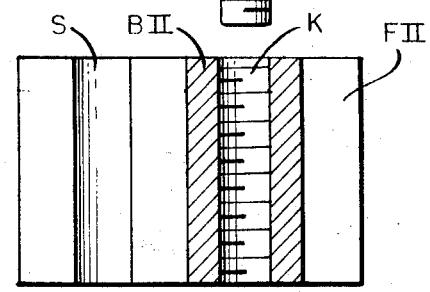
FIG. 3 shows the other of the two parts of a joint vertically in a section through the side projection.

The second part according to FIGS. 3 and 4 has two parallel spaced projecting web portions which extend from its base part B II, and are provided on the surfaces with guiding grooves S which are parallel to the base part and approximately in the midlength of the projection L II. These guiding grooves and the distance between the segments and their length are so dimensioned that an exact fit is obtained when the segment L I of the first joint part perpendicular to the axial direction of its beam element is inserted between the projections L II. The first part is inserted until the plate P rests against the projections L II. In the base part of the second joint part is a threaded channel K, corresponding to the hole H in the plate P, for a screw S I, as shown in FIG. 5. The second joint part also has strips or the like F II to which its beam element is attached by means of soldering or welding.

Figure 6:
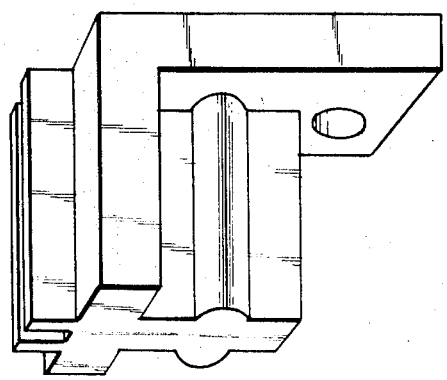
FIGS. 6 and 7 show the two joint parts in perspective.
Figure 7:
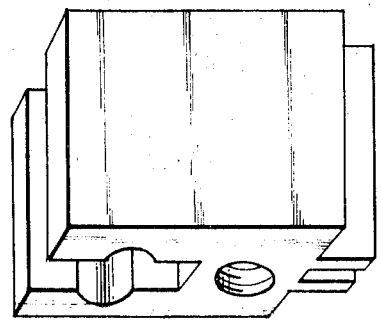

The appearance of the groups of segments is clearly shown in FIGS. 6 and 7 which illustrate them in perspective.

If necessary the first joint part may be provided with two or more projections L I, and the other joint part may then be provided with additional projections L II as well so that each part L I can be slid into a corresponding mating recess on the other part. The guiding strips and corresponding grooves on the segments may have a different design from that shown in the drawings, although this design offers optimum control and reinforcement. The plate P and base part B II may also be provided with more than one hole if this is necessitated by the width of the elements.

Within odontology, the means according to the invention can be used to join an extension part and a fixation part in so-called optionally removable saddle extension bridges which are used in prosthetic surgery. For this purpose, so-called attachments presently on the market have had to be used in combination with a screw of a selected dimension. The system according to the invention thus has the advantage that a certain parallel displacement of the joined sections is possible if it should prove necessary for some reason after a time. If, for example, the upper part of the base part B II and segments L II in the second group are ground down somewhat, the first group of segments can be inserted somewhat further and still be attached with the same screw as before.

The device can also be used as attachment plate for the false tooth in resection dentures or as attachment plate for a so-called transversal bar for reconstructions in the upper jaw.

What I claim is:

1. Means for detachably joining two beam elements by a joint which is resistant to bending and torsion forces comprising, first and second joints parts each adapted to be permanently secured to a respective one of said two elements, said first joint part including a base portion extending substantially normal to the longitudinal axis of said two beam elements and at least one first web portion projecting outwardly of said base portion in the direction of said axis, said first web portion having at least one laterally projecting elongate protuberance which extends normal to said longitudinal axis, said second joint part also including a base portion extending normal to said longitudinal axis and having at least two parallel-spaced web portions projecting outwardly of the respective base portion, said two web portions of said second part having a space therebetween and a projecting length such as to receive with a close fit said first web portion of said first part, at least one of said parallel web portions of said second joint part defining an elongate recess therein extending normal to said longitudinal axis for receiving said protuberance on said first web portion, whereby said two joint parts may be engaged by sliding said first web part into the recess defined by said two web portions of said second joint part and with said elongate protuberance sliding into said elongate recess, said sliding engagement of said two parts occuring in a direction at right angles to said longitudinal axis, the relative motion of said two joint parts being at right angles to said longitudinal axis of said beam elements, one of said two joint parts including a plate portion generally normal to both the plane of the web portions of said part and to the plane of the base portion of said part for limiting the relative motion of said one joint part to the other joint part.

2. The combination of claim 1 wherein said base and web portion of each joint part are integrally formed and said plate is integrally formed with the base portion and web of the joint part which includes said base portion.

3. The combination of claim 1 wherein said protuberance is of generally semicircular cross section and the recess in the web portion of the other part is also of generally semicircular cross section.

4. The combination of claim 3 wherein a protuberance of generally semicircular cross section is formed on each side of said first web and corresponding recesses of generally semicircular cross sections are formed on both inside surfaces of said web portions of said second joint part.

5. The combination of claim 1 in which said protuberance on said first web portion is formed thereon at substantially the mid portion of its projecting length outwardly of its base portion.

6. The combination of claim 1 which further includes a means for securing together said first and second joint parts to prevent their slidable separation in said direction normal to said longitudinal axis.